(12) United States Patent
Daigle et al.

(10) Patent No.: US 11,023,861 B2
(45) Date of Patent: Jun. 1, 2021

(54) SYSTEM AND METHOD FOR IMPLEMENTATION AND ADMINISTRATION OF AN EMPLOYER-SPONSORED RETIREMENT PLAN

(71) Applicant: BIDMONI, INC., Moss Point, MS (US)

(72) Inventors: Stephen Daigle, Ocean Springs, MS (US); Michael Steffan, Jr., Fort Pierce, FL (US); Kendall Dixon, Rome, GA (US)

(73) Assignee: BIDMONI, INC., Moss Point, MS (US)

( * ) Notice: Subject to any disclaimer, the term of this patent is extended or adjusted under 35 U.S.C. 154(b) by 0 days.

(21) Appl. No.: 16/643,797

(22) PCT Filed: Aug. 3, 2018

(86) PCT No.: PCT/US2018/045250
§ 371 (c)(1),
(2) Date: Mar. 2, 2020

(87) PCT Pub. No.: WO2019/028412
PCT Pub. Date: Feb. 7, 2019

(65) Prior Publication Data
US 2020/0265386 A1    Aug. 20, 2020

Related U.S. Application Data

(60) Provisional application No. 62/540,625, filed on Aug. 3, 2017.

(51) Int. Cl.
*G06Q 10/00*    (2012.01)
*G06Q 10/10*    (2012.01)
(Continued)

(52) U.S. Cl.
CPC ....... *G06Q 10/1057* (2013.01); *G06F 3/0482* (2013.01); *G06F 3/0483* (2013.01);
(Continued)

(58) Field of Classification Search
CPC .... G06Q 10/1057; G06Q 30/08; G06Q 40/06; G06Q 40/08; G06F 3/0482; G06F 3/0483; G06F 9/542
See application file for complete search history.

(56) References Cited

U.S. PATENT DOCUMENTS

2003/0105692 A1 *  6/2003  Gilbert .................. G06Q 40/02
                                                    705/35
2003/0191703 A1 * 10/2003  Chen ..................... G06Q 40/06
                                                    705/36 R
(Continued)

*Primary Examiner* — Gabrielle A McCormick
(74) *Attorney, Agent, or Firm* — Mark C. Johnson; Johnson Dalal

(57) ABSTRACT

A system and method for implementation and administration of an employer-sponsored retirement plan that assists employers and retirement plan providers with managing their fiduciary responsibilities for an employer-sponsored retirement plan by enabling users, such as an employer and a retirement plan provider, to implement and administer an employer-sponsored retirement plan in an efficient, and cost-effective manner, by collecting and analyzing data that is pertinent to a desired employer-sponsored retirement plan; receiving notifications from a notification manager if certain conditions of the retirement plan are met; drafting a retirement request for proposal based on the categorically analyzed data about retirement plan; bidding on the retirement plan from service providers; and monitoring the selected employer-sponsored retirement plan after implementation. The method also includes steps of checking, by an employee, on the status of the employer-sponsored retirement plan; and suggesting, by the employee, to the user to utilize the method.

19 Claims, 12 Drawing Sheets

(51) Int. Cl.
*G06F 3/0482* (2013.01)
*G06F 3/0483* (2013.01)
*G06F 9/54* (2006.01)
*G06Q 30/08* (2012.01)
*G06Q 40/06* (2012.01)

(52) U.S. Cl.
CPC ............ *G06F 9/542* (2013.01); *G06Q 30/08* (2013.01); *G06Q 40/06* (2013.01)

(56) References Cited

U.S. PATENT DOCUMENTS

| | | | |
|---|---|---|---|
| 2007/0288399 A1* | 12/2007 | Reynolds | G06Q 40/00 705/36 R |
| 2014/0207706 A1* | 7/2014 | Sitaram | G06Q 40/02 705/36 R |
| 2015/0066686 A1* | 3/2015 | Hoch | G06Q 30/0222 705/26.7 |
| 2015/0095265 A1* | 4/2015 | Feinendegen | G06Q 40/06 705/36 R |
| 2015/0254778 A1* | 9/2015 | Kmak | G06Q 40/06 705/36 R |
| 2016/0358258 A1* | 12/2016 | Dintenfass | G06Q 40/06 |
| 2016/0378932 A1* | 12/2016 | Sperling | G06Q 40/08 705/3 |
| 2017/0200126 A1* | 7/2017 | Roy | G06Q 10/1057 |
| 2018/0068274 A1* | 3/2018 | Buffington | G06Q 40/06 |

\* cited by examiner

Employer Profile

Company Name 402
SINGING RIVER FEDERAL CREDIT UNION

*Address Line 1
6006 HIGHWAY 63Z    408a

Address Line 2
                    408b

*City
MOSS POINT

*State
Mississippi

*Zip Code
39563

User Details

*First Name
Stephen

*Last Name
Daigle

*Email Address
daigleandassociates@gmail.com

*Phone
2284759531

Extension

Mobile Number
(e.g. 999-999-9999)

Fax Number
(e.g. 999-999-9999)    408c

*Time Zone
(UTC-05:00) Eastern Time (US & Canada)

☐ Save    ✕ Cancel

SYSTEM AND METHOD FOR IMPLEMENTATION AND ADMINISTRATION OF AN EMPLOYER-SPONSORED RETIREMENT PLAN

CROSS-REFERENCE TO RELATED APPLICATION

This application is a national stage filing of International Application Number PCT/US18/45250, filed Aug. 3, 2018, which claims priority to U.S. Provisional Patent Application No. 62/540,625, filed Aug. 3, 2017, the entirety of which is incorporated by reference.

FIELD OF THE INVENTION

The present invention relates generally to a system and method for implementation and administration of an employer-sponsored retirement plan, and, more particularly, relates to a computerized system and method that assists employers and retirement plan providers with managing their fiduciary responsibilities for an employer-sponsored retirement plan by providing data from multiple sources, categorically analyzing the data, notifying the user of changes to the data, allowing service providers to bid on providing services related to employer-sponsored retirement plans, and then monitoring a selected employer-sponsored retirement plan after implementation.

BACKGROUND OF THE INVENTION

Typically, retirement planning is the process of determining retirement income goals and the actions and decisions necessary to achieve those goals. Retirement planning includes identifying sources of income, estimating expenses, implementing a savings program and managing assets.

In general, retirement plans are based on the needs and plans of the retiree. The retirees often have different financial goals for retirement. For many people, an important financial goal during retirement is to have perpetual income until death, as the individual wishes to avoid running out of money while still alive. As part of this desire, individuals want to have enough money to pay long term care costs and health care costs during later years in life. At the same time, many people want to have money for leisure spending, particularly in the early years of retirement, to enjoy some of the things that they did not have the time to enjoy previously, such as traveling. There are also people who want money to pass on to heirs and charitable organizations.

It is known that one type of retirement plan is an employer-sponsored retirement plan. However, employers face numerous challenges in managing productivity and efficiency, including uncovering ways to reduce business taxes, keep employee benefit costs low, and hire and retain quality employees. Not surprisingly, many employers have turned to group retirement plans as part of a compensation package to attract quality employees while encouraging employee loyalty, thereby reducing the time employers spend hiring and training. A retirement plan can also help employers gain important tax advantages, as contributions and costs are deductible business expenses for many plan designs.

Generally, retirement plans fall under one of two categories: qualified or nonqualified. Qualified plans meet the requirements of Section 401(a) of the Internal Revenue Service (IRS) Code and Regulations. By meeting these requirements, qualified plans offer immediate tax advantages to employers and their employees. Qualified plans are either defined contribution or defined benefit plans. Examples of qualified plans include profit sharing plans, money purchase plans, defined benefit pension plans, etc.

Therefore, a need exists to overcome the problems with the prior art as discussed above.

SUMMARY OF THE INVENTION

The invention provides a system and method for implementation and administration of an employer-sponsored retirement plan that overcomes the hereinafore-mentioned disadvantages of the heretofore-known devices and methods of this general type, and, more particularly, relates to a computerized system and method that assists employers and retirement plan providers with managing their fiduciary responsibilities for an employer-sponsored retirement plan. The system and method enables a user, such as an employer and a retirement plan provider, to implement and administer an employer-sponsored retirement plan in an efficient, and cost-effective manner, by collecting and analyzing data that is pertinent to a desired employer-sponsored retirement plan; receiving notifications from a notification manager if certain conditions of the retirement plan are met; drafting a retirement request for proposal based on the categorically analyzed data about the retirement plan; bidding on the retirement plan offered by competing service providers; and monitoring the selected employer-sponsored retirement plan after implementation.

The retirement plan-related data is obtained from multiple sources and portals, including: an employer application, an employer questionnaire, a public plan data, and a user plan request. The data can include third party data, automatic public data, and is available from multiple portals accessible by the user, such as an employer or retirement plan provider, a service provider, and an employee. The system then categorically sorts the data to help in analyzing and selecting the appropriate retirement plan. The categorically analyzed data is used by service providers to offer and bid on provided services related to the retirement plans. The user selects from the plan options, and then has the subsequent ability to monitor the retirement plan so as to make changes if necessary.

A computer-implemented method for implementation and administration of an employer-sponsored retirement plan includes an initial Step of providing a data matrix array having a plurality of data input fields demarcated into a plurality of independent data receiving sources including a plurality of a series of business-identifying data each identified by a unique business employer identification number, the data matrix array stored on a memory resident on an administrator server.

Another Step includes collecting retirement plan-related data from multiple sources.

The method may further comprise a Step of storing the collected data in a data storage unit.

A Step includes determining if the collected data is pertinent for an employer-sponsored retirement plan.

Another Step in the method includes initiating, through a computing processor, a computer-implemented plan analyzing session on an administrator server, the computer-implemented plan analyzing session including sub-routines of: determining if the collected data is pertinent for a retirement plan; if the data is pertinent, analyzing the collected data with a data analyzer; and processing the analyzed data in a categorical analyzer.

In some embodiments, a Step comprises, if the data is pertinent, analyzing the collected data with a data analyzer.

A Step includes storing the analyzed data.

In some embodiments, a Step may include processing the analyzed data in a categorical analyzer.

A Step comprises storing the categorically analyzed data in a categorical data storage.

The method may further comprise a Step of providing, by a notification manager, a notification of updates to the categorically analyzed data, the notification determined by at least one condition.

A Step includes requesting by a user, the categorically analyzed data.

A Step comprises transmitting the categorically analyzed data from the categorical analyzer to the user.

The method may further comprise a Step of determining whether to proceed with the employer-sponsored retirement plan, based at least partially on the categorically analyzed data.

A Step includes if proceeding with the employer-sponsored retirement plan, drafting, by the user, a retirement request for proposal based at least partially on the categorically analyzed data.

The method may further comprise a Step of displaying, by at least one service provider, at least one retirement plan-related service for the employer-sponsored retirement plan.

A Step includes bidding, by the at least one service provider, for the employer-sponsored retirement plan.

A Step comprises ascertaining a recommended retirement plan utilizing: the plurality of data input fields from the plurality of independent data receiving sources, including one of the plurality of the series of business-identifying data based on the unique business employer identified number corresponding to the submitting entity unique business employer identification number and the data, sequentially received from a plurality of independent and separate web portal Internet access points.

The method may further comprise a Step of analyzing, by the user, the bid for the employer-sponsored retirement plan.

Another Step includes selecting a service provider to provide the employer-sponsored retirement plan.

A final Step includes monitoring the selected employer-sponsored retirement plan based on internal data provided by the service provider, or the user, or both.

In accordance with a further feature of the present invention, the multiple sources for the collected data include at least one of the following: an employer application, an employer questionnaire, a public plan data, and a user plan request.

In accordance with a further feature of the present invention, the employer application for supplying data comprises questions about a current employer-sponsored retirement plan and desired employer-sponsored retirement plan.

In accordance with a further feature of the present invention, the collected data is user defined or a systems default.

In accordance with a further feature of the present invention, the employer-sponsored retirement plan is at least partially based on past, present, and projected market conditions.

In accordance with a further feature of the present invention, the data is retrieved through a data collector.

In accordance with a further feature of the present invention, the data storage unit includes at least one of the following: an internal memory, a cloud, a server, a database, a processor, a USB device, and a disk.

In accordance with a further feature of the present invention, the collected data is from multiple sources.

In accordance with a further feature of the present invention, the user includes at least one of the following: an employer, a retirement plan provider, an agent, a system, and another software process.

In accordance with a further feature of the present invention, the notifications include at least one of the following: emails, texts, phone calls, social media updates.

In accordance with a further feature of the present invention, the at least one condition for the notification include detection of new data in the categorical data storage, the new data based on a predetermined timeframe.

In accordance with a further feature of the present invention, the step of querying the categorically analyzed data is performed through an interface.

In accordance with a further feature of the present invention, the at least one service provider includes at least one of the following: a bookkeeper and a third party administrator.

In accordance with a further feature of the present invention, the step of monitoring the employer-sponsored retirement plan based on internal data, further comprises comparing the result of the original analysis at the time of the bid against a daily analysis which factors in additional data collected since the bid.

In accordance with a further feature of the present invention, the step of monitoring the employer-sponsored retirement plan based on internal data, further comprises monitoring key metrics which deviate from acceptable levels, whereby deviation from the key metrics triggers a notification to the user to initiate a formal review of the employer-sponsored retirement plan.

In accordance with a further feature of the present invention, the step of analyzing the bid further comprises providing a score based on key metrics from a profile of the service provider and at least one attribute of the bid.

In accordance with a further feature of the present invention, the step of analyzing the bid further comprises providing a direct cost comparison of the proposed employer-sponsored retirement plan from the service provider to the user employer-sponsored retirement plan.

In accordance with a further feature of the present invention, the method further comprises a step of determining a total cost for the employer-sponsored retirement plan.

In accordance with a further feature of the present invention, the step of determining a total cost further comprises combining a record keeper fee, a third part administrator fee, and an investment lineup fee.

In accordance with a further feature of the present invention, the method further comprises a step of checking, by an employee, on the status of the employer-sponsored retirement plan.

In accordance with a further feature of the present invention, the method further comprises a step of suggesting, by the employee, to the user to utilize the method for selecting the employer-sponsored retirement plan.

One objective of the present invention is to provide a computer-implemented system and method for assisting employers and plan providers with managing their fiduciary responsibilities.

Another objective of the present invention is to use data from multiple sources in determining an optimal employer-sponsored retirement plan.

Another objective of the present invention is to allow the employer to answer a questionnaire about a current employer-sponsored retirement plan and desired employer-sponsored retirement plan.

Another objective of the present invention is to analyze the obtained data, and then categorize the data, so as to break down the data to present desired retirement plan options.

Another objective of the present invention is to automatically notify the user when data about the potential retirement plan changes.

Another objective of the present invention is to enable multiple service providers to compete and bid on providing retirement plans.

Another objective of the present invention is to monitor the selected employer-sponsored retirement plan based on internal data provided by the user and service provider, so as to better understand the effectiveness of the selected retirement plan.

Another objective of the present invention is to provide a retirement plan that helps employers gain tax advantages, as contributions and costs are deductible business expenses for many retirement plan designs.

Another objective of the present invention is to enable an employee to check in and suggest changes to the selected retirement plan.

Another objective of the present invention is to reduce costs and streamline the process for providing employer-sponsored retirement plans.

Although the invention is illustrated and described herein as embodied in a System and Method for Implementation and Administration of an Employer-Sponsored Retirement Plan, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 4A-4C are a service provider questionnaire, in accordance with the present invention;

FIGS. 7A-7C are pages for a service provider questionnaire, in accordance with the present invention.

DETAILED DESCRIPTION

Figure 1:
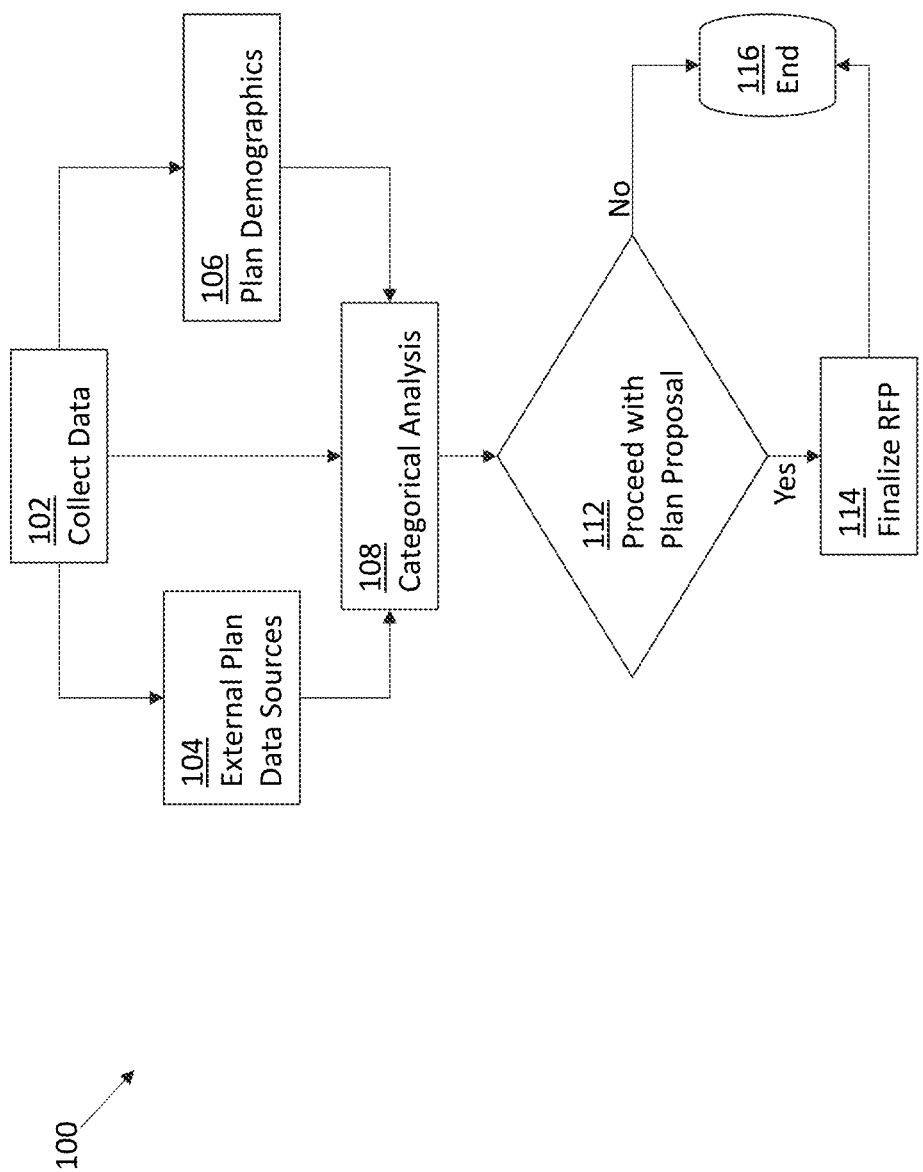
FIG. 1 is a block diagram of an exemplary system for implementation and administration of an employer-sponsored retirement plan, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system 100 and method for implementation and administration of an employer-sponsored retirement plan. Embodiments of the invention provide a system 100 and method for implementation and administration of an employer-sponsored retirement plan that assists employers and retirement plan providers with managing their fiduciary responsibilities for an employer-sponsored retirement plan. The system 100 and method enables a user, such as an employer and a retirement plan provider, to implement and administer an employer-sponsored retirement plan in an efficient, and cost-effective manner.

In some embodiments, the system 100 and method involves collecting and analyzing data that is pertinent to a desired employer-sponsored retirement plan; receiving notifications from a notification manager if certain conditions of the retirement plan are met; drafting a retirement request for proposal based on the categorically analyzed data about retirement plan; bidding on the retirement plan from service providers; and monitoring the selected employer-sponsored retirement plan after implementation. The method also includes steps of checking, by an employee, on the status of the employer-sponsored retirement plan; and suggesting, by the employee, to the user to utilize the method.

Referring now to FIG. 1, one embodiment of the present invention is shown in a Block diagram view. FIG. 1 shows several advantageous features of the present invention, but, as will be described below, the invention can be provided in several shapes, sizes, combinations of features and components, and varying numbers and functions of the components. The first example of a system 100 for implementation and administration of an employer-sponsored retirement plan provides a Block 102 that collects retirement plan-related data from multiple sources and portals. This eclectic collection of data that can be used for implementation and administration of the retirement plan is one of the unique aspects of the present invention.

The different sources are unique in that they provide eclectic sources that enhance the final selection of the retirement plan. A Block 104 shows external plan data sources that can be used. A Block 106 shows a plan demographics data source. In other embodiments, the data sources may include, without limitation, an employer application, an employer questionnaire, a public plan data, and a user plan request. The data can include third party data, automatic public data, and is available from multiple portals accessible by the user, such as an employer or retirement plan provider, a service provider, and an employee.

Continuing with FIG. 1, the system 100 provides a Block 108 that categorically sorts the collected data to help in analyzing and selecting the appropriate retirement plan. The categorical analysis includes categorizing information. For example, the age, demographics, income history, and retirement needs of an employee may be segregated and assigned points. From the points-categorization, the system can create graphics, such as charts and pies that form a picture of the retirement needs and requirements, so that an appropriate retirement plan can be determined (FIGS. 5A-5B).

Next, a Block 110 displays recommendations for an employer-sponsored retirement plan, based on the categorized data. The recommendations can be automatically displayed on an interface, or requested. The recommendations may also be offering from at least one service provider. The categorically analyzed data is used by service providers to offer and bid on provided services related to the retirement plans.

As Block 112, the user selects from the plan options. The user takes into account the collected data, and the analysis of categorization of the data in making a selection. In a bock 114, the user finalizes a draft for a retirement request for proposal (RFP). The RFP is based at least partially on the categorically analyzed data. The service provider may then show the offered services and bid on the retirement plan based on the RFP. After selecting the retirement plan, the user has the subsequent ability to monitor the retirement plan so as to make changes if necessary.

Figure 2:
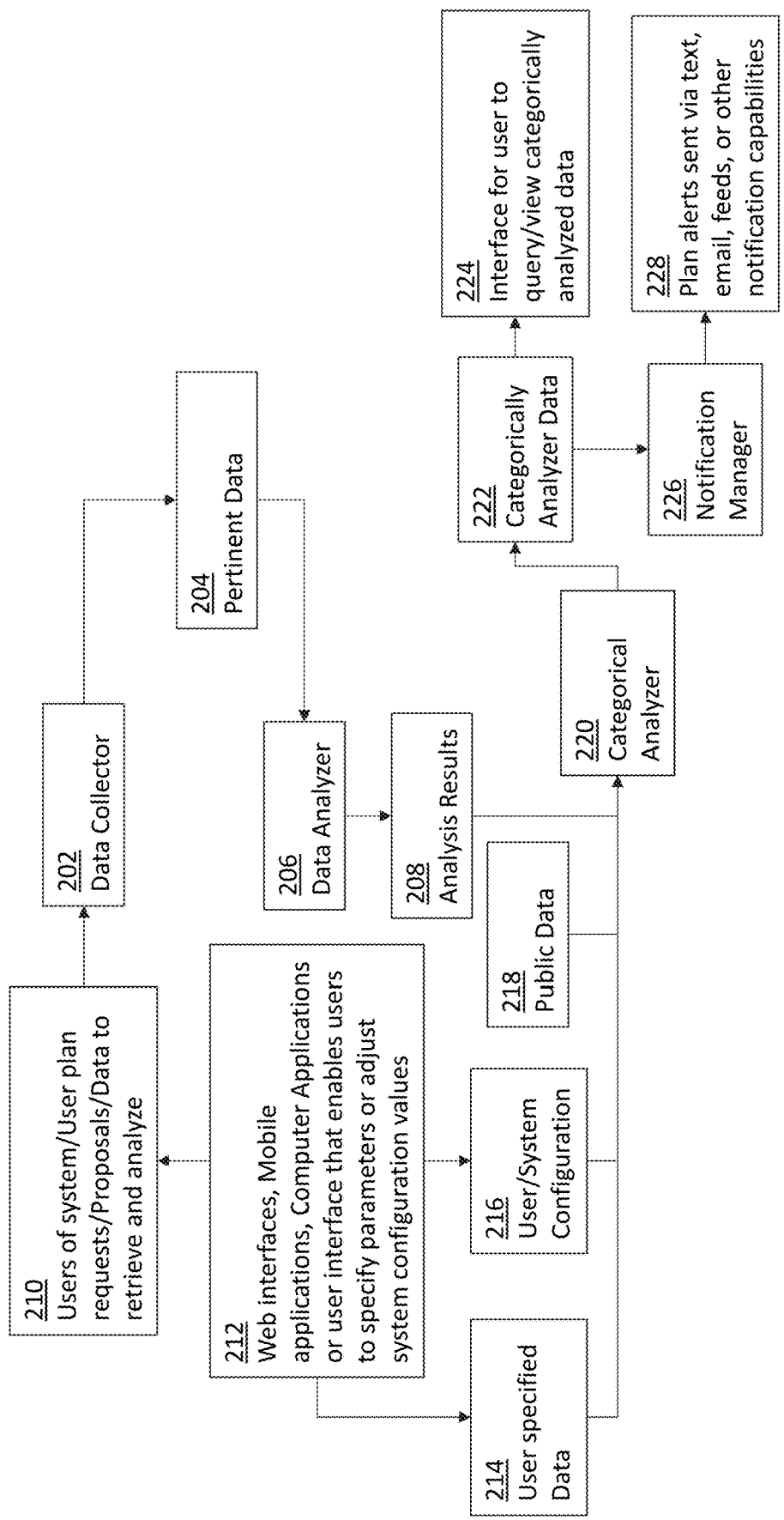
FIG. 2 is a block diagram of an alternative embodiment of a system for implementation and administration of an employer-sponsored retirement plan, in accordance with the present invention.

Turning now to FIG. 2, a system 200 for implementation and administration of an employer-sponsored retirement plan. Here, system 200 helps an employer and a retirement plan provider in managing fiduciary responsibilities for an employer-sponsored retirement plan. The employer-sponsored retirement plan, as discussed here, may include, a defined benefit plan, or pension plan, that promises a specified monthly benefit at retirement. The benefit may be a fixed dollar amount or may depend on a plan formula that considers factors such as salary and years of service. In the defined benefit plan, employers sponsor defined benefit plans and typically hire investment managers to make investment choices. The employer shoulders the investment risks. In yet another employer-sponsored retirement plan, a defined contribution plan, such as a 401(k) plan, does not promise a specific payment upon retirement. In these plans, the employee or employer (or both) contribute to the employee's individual account under the plan, sometimes at a set rate, such as 5% of annual salary.

As system 200 shows, a Block 202 references a data collector that collects the retirement plan-related data. The data collector may collect data in an automated, or manual manner. For example, the data collector may be a computer that queries for financial records from a bank account. The data collector may be a phone bank, in which a staffer calls employees to enquire about their expected retirement age. The data collector may be a digital or paper questionnaire for the user to fill out (FIGS. 4A-4B). This questionnaire helps the system 200 better analyze the most appropriate retirement plan for the user. Another advantage of the questionnaire is to help the employer gain tax advantages, as contributions and costs are deductible business expenses for many retirement plan designs.

As Block 204 references, the collected, pertinent data is stored in a data storage unit. The data storage unit may include, without limitation, an internal memory, a cloud, a server, a database, a processor, a USB device, and a disk. Once stored in a data storage unit, the user may review the data to determine if the data is pertinent for an employer-sponsored retirement plan. This verification of pertinence can include checking the data to make sure that the data is for the correct employee, verifying the contact information is up to date, verifying that the financial data is up to date, and verifying the type of retirement plan the employee has an indicated interest.

Figure 5:
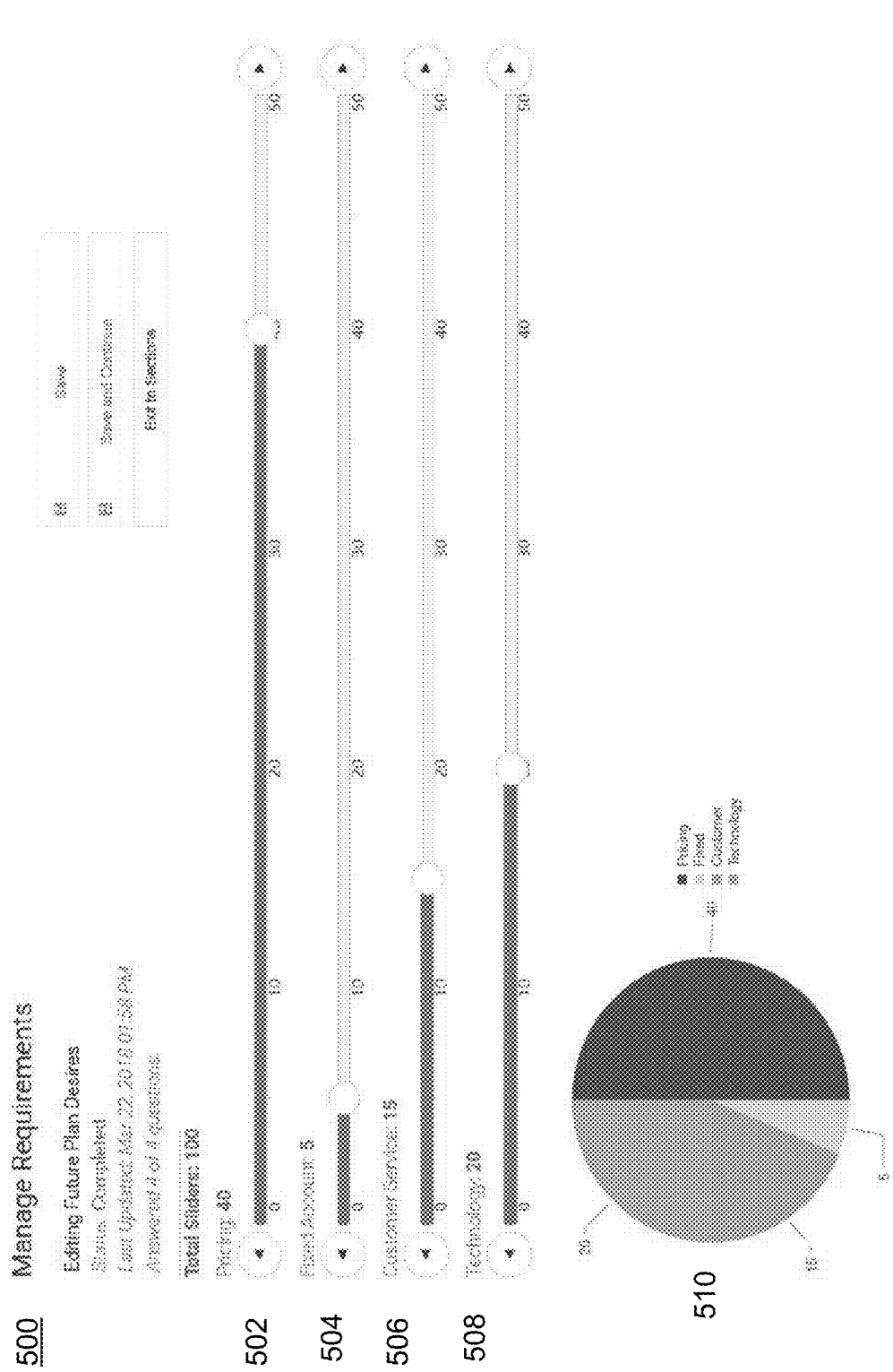
FIG. 5 is a categorical analyzer and values on a sliding scale, in accordance with the present invention.

From the collected data, the system can create graphics, such as charts and pies that form a picture of the retirement needs and requirements, so that an appropriate retirement plan can be determined (FIG. 5). For example, in one embodiment, the user receives and stores a plurality numerical values, each representing a retirement plan characteristic, collectively totaling 100%, through a digital user interface provided to the user for independent selection.

A Block 206 references a data analyzer that helps the user in checking the collected data for pertinence and accuracy. The data analyzer may include an algorithm that performs if-then functions, Boolean functions, and other logic circuitry necessary to make decisions. In one non-limiting embodiment, the data analyzer may utilize artificial intelligence in parsing the collected data for pertinence and accuracy.

In one non-limiting embodiment, the data is initially analyzed in the data analyzer by calculating a "Net Fixed Rate", "Total Fees", "Fixed Account Rating", and "Annual Interest from Fixed Account" for each plan sponsor RFP. After receiving bids from at least one service provider, substantially the same cost-related data (Net Fixed Rate, Total Fees, Fixed Account Rating, and Annual Interest from Fixed Account is analyzed from each bidding service provider. The sub-routines of the computer-implemented retirement plan analyzing session includes utilizing each of the plurality numerical values as weighted values to dictate the recommended retirement plan.

As used in the present invention, the net fixed rate is the current rate in the guaranteed interest account less applicable fees. The total fees are all of the fees required to run the plan, whether paid by plan participants of the company. The fixed account rating looks at the net rate but also identifies negative factors such as market value adjustments or restrictions on participant transfers. The annual interest is the net fixed rate multiplied by the amount of assets in the guaranteed interest.

A Block 208 references analysis results that are displayed and returned to the user. The results may be requested by the user, or automatically transmitted to the user. This automated process helps streamline the retirement plan implementation.

Continuing with FIG. 2, a Block 212 provides communication devices that allow the user to specify parameters and adjust system configuration values. The communication devices may have an interface with Web interfaces, mobile applications, computer applications, and any other type of user interface. This can be useful when starting the system 200. Once the parameters have been set, the data can be verified and analyzed as discussed above, or sent directly through for categorical analysis, as described in Block 220.

However, the unverified data can include: user specified data 214 (questionnaire); User/System configuration 216 (predetermined personal data of employee); and Public Data 218 (financial records). As Block 210 references, the data that is to be verified and analyzed in Block 202 can be collected from the user of the system 200, user plan requests, RFP, and general data to be retrieved and analyzed.

In any case, the collected data next passes through a categorical analyzer, as referenced in Block 220. The categorical analyzer is configured to provide more detailed analysis of the data by categorizing the data into discrete units of different retirement plan options.

In one non-limiting embodiment, the categorical analysis generates a "Fee Ranking" that is dependent on categories derived from retirement plan sizes (i.e. assets within the plan). The categories are broken down based on plan size (i.e. 0 to 10 k, 10 k to 50 k, 50 k to 100 k, etc). The fee rank is calculated for the RFP drafted by the user, and for each bidding service provider. Additionally, as bids are provided by the at least one service provider; the bids are given a final RFP score. The final RFP score is based on, the Fee Ranking described above, as well as categorized capabilities pertaining to Plan Features, Available Technology, and Customer Service.

The categorically analyzed data is then stored in a categorical data storage, as Block 222 references. The categorical data storage may include, without limitation, an internal memory, a cloud, a server, a database, a processor, a USB device, and a disk.

Block 224 references that the user can review and query the categorically analyzed data from an interface. The system 200 is also unique in that it allows any updates to the categorically analyzed data to be automatically noted and alerted to the user by a notification manager, as referenced in Block 224. In some embodiments, actuation of the notification is determined by at least one condition. The condition for the notification may include: detection of new data in the categorical data storage, or that the new data is based on a predetermined timeframe. Block 228 also shows how the notification can be a plan alert that is automatically sent by email, text, phone call, or social media update.

The first example of a method 300 for implementation and administration of an employer-sponsored retirement plan, includes an initial Step 302 of providing a data matrix array having a plurality of data input fields demarcated into a plurality of independent data receiving sources including a plurality of a series of business-identifying data each identified by a unique business employer identification number, the data matrix array stored on a memory resident on an administrator server.

The method may further comprise a Step 304 of collecting, by a user, through the data matrix array, retirement plan-related data from multiple sources. The collection involves receiving and storing employer data and employee data that is inserted into the digital user interface of the user. The multiple sources for the collected data include at least one of the following: an employer application, an employer questionnaire, a public plan data, and a user plan request. The user is defined as an employer who is providing the employer-sponsored retirement plan—generally to an employee. The user may be a small business owner, a large corporation, or a government entity. However, the user may also include a retirement plan provider assisting the employer, an agent, a system, and another software process.

Figure 4C:
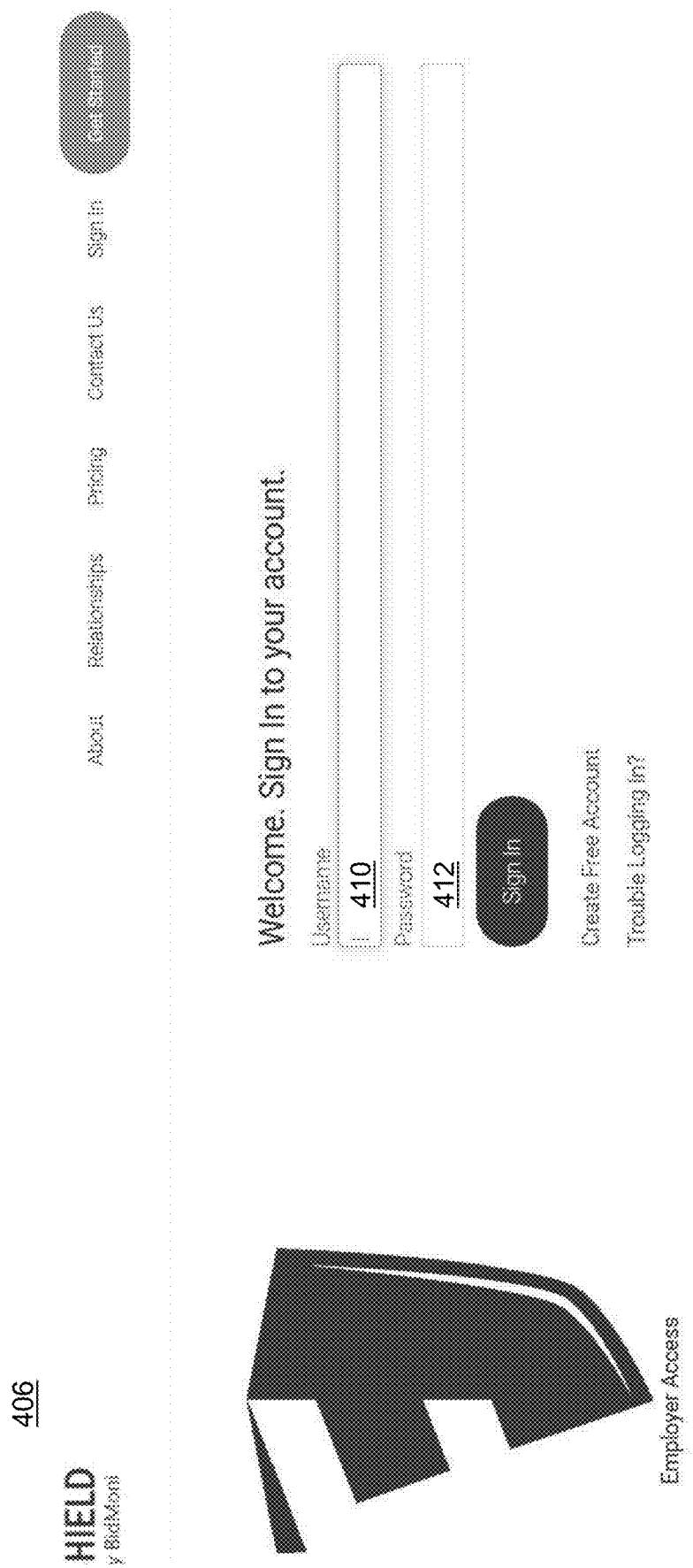

An exemplary employer application and questionnaire 400 is referenced in FIGS. 4A-4C. The employer application has data input fields 408a, 408b, 408c that are filled out by a user (employer) who wants to provide an employer-sponsored retirement plan to an employee. The employer application and questionnaire 400 includes a page 402 to input: personal information; contact information; and financial questions (FIG. 4A). For example, a name of a company, an address, a phone number, and an email address.

Turning now to FIG. 4B, the employer application and questionnaire 400 may also have a financial page 404 with data input fields 408d, 408e, 408f to input: if another retirement plan is being used; the current plan assets; the number of employees enrolled in the plan; whether there is an employer match; whether the user wants the subsequent bid by the at least one service provider to be a blind bid, or an open bid; and questions for the user to answer about a current retirement plan being used, and a desired retirement plan that the user is interested in the future. The user may also have to log in in a Log In page 406 to access the employer application and questionnaire 406 (FIG. 4C). Log In page 406 may request a User Name 410 and Password 412.

In one embodiment, the method also includes storing the collected data in a data storage unit. The stored data can be used to analyze the retirement plan options. The system allows the user, the service provider, and the notification manager to access the collected data, as needed. The data storage unit may include, without limitation, an internal memory, a cloud, a server, a database, a processor, a USB device, and a disk.

As referenced in FIG. 5, the method provides a Step 306 of initiating, through a computing processor, a computer-implemented plan analyzing session on an administrator server. The analyzing session allows the user to review and calculate financial data through use of sub-routines to determine if the collected data is pertinent for a retirement plan. In this manner, the user can select the appropriate retirement plan. The pertinent data includes the required retirement benefits, the contribution amount, the required size of the retirement plan, if the account is variable or fixed, and whether the employee requires financial planning assistance.

If the data is pertinent, the collected data is analyzed with a data analyzer. The data analyzer can include a spreadsheet, a processor, and formula for calculating financial net worth and costs for retirement. The data analysis includes receiving and storing numerical values, with each numerical value representing a plan characteristic, collectively totaling 100%. The numerical values are viewable and inputted by the user through a digital user interface for independent selection. The sub-routines of the computer-implemented plan analyzing session utilize each of the numerical values as weighted values to dictate the recommended retirement plan.

The analysis provides a calculation of values, such as: Net Fixed Rate, Total Fees, Fixed Account Rating, and Annual Interest from Fixed Account. This analysis is performed for both the collected data and for the bid provided by the service provider. In this manner, the user can compare price points of the different options of retirement plans.

Because the retirement plan is based on past, present, and projected market conditions, the method also includes storing the categorically analyzed data in a categorical data storage. The storage allows for a historical data storage. So that past retirement plans can be compared with present retirement plans. This ability to access all the data from the categorical data storage allows the user, service provider, or notification manager to have access to the categorized data, so as to select from the retirement plan options, better understand pricing, and send appropriate notifications.

Looking again at FIG. 5, the step of processing the analyzed data in a categorical analyzer 500, further comprises calculated values, such as a Fee Ranking. The Fee ranking is dependent on categories derived from multiple retirement plan sizes. This can include a sliding score from 0 to 50. For example, a Pricing value 502 is 50; a Fixed Account value 504 is 5; a Customer Service value 506 is 15; and a Technology value 508 is 20. A pie chart 510, or other graphical chart, can be used to determine the categorical values. These values help the user and the service provider to determine the appropriate retirement plan. For example, a high pricing value indicates that the employee requires a larger amount for retirement. And a low customer service indicates that the employee does not require too much assistance in understanding the retirement plan.

From these values, the categorically analyzed data generates a final Request for Proposal score. This is used to assess the selected service provider and the retirement plan option provided. This score helps the user determine the affordability and price range of the service provider. The final Request for Proposal score is based on the Fee Ranking and categorized capabilities pertaining to Plan Features, Available Technology, and Customer Service.

In some embodiments, a Step 308 comprises providing, by a notification manager, a notification of updates to the categorically analyzed data, the notification determined by at least one condition. The condition for the notification include variables, such as detection of new data in the categorical data storage, or new data based on a predetermined timeframe, or deviation from a key metric. The key metric can include a price point for the retirement plan, or an age for retirement.

In some embodiments, a Step 310 includes requesting by the user, the categorically analyzed data. The user can use the categorically analyzed data to determine the retirement plan options. A Step 312 comprises determining whether to proceed with the retirement plan, based at least partially on the categorically analyzed data. The decision factors in the values discussed above. For example, the final Request for Proposal score is reviewed to determine of the price for the retirement plan matches the abilities of the user and employee.

The method 300 may further comprise a Step 314 of, if proceeding with the retirement plan, drafting, by the user, a retirement request for proposal based at least partially on the categorically analyzed data. The RFP is viewed by the service providers, and bids are subsequently sent for retirement plans, based on the RFP.

Figure 6:
FIG. 6 is a web page of a service provider, showing a profile and services provided, in accordance with the present invention.

A Step 316 includes bidding, by at least one service provider, for the retirement plan. The at least one service provider includes a bookkeeper and a third party administrator. FIG. 6 references a page for a service provider 600. The service provider 600 can tailor the page to display retirement plans services that can be viewed by the user. The page may include provider information 602, such as: a personal profile, retirement plans offered, past retirement plans, number of plans currently servicing, Total DC Plans Assets serviced, and Total DC Plan Participants serviced. This information helps the user to select the retirement plan and service provider 600.

Figure 7A:
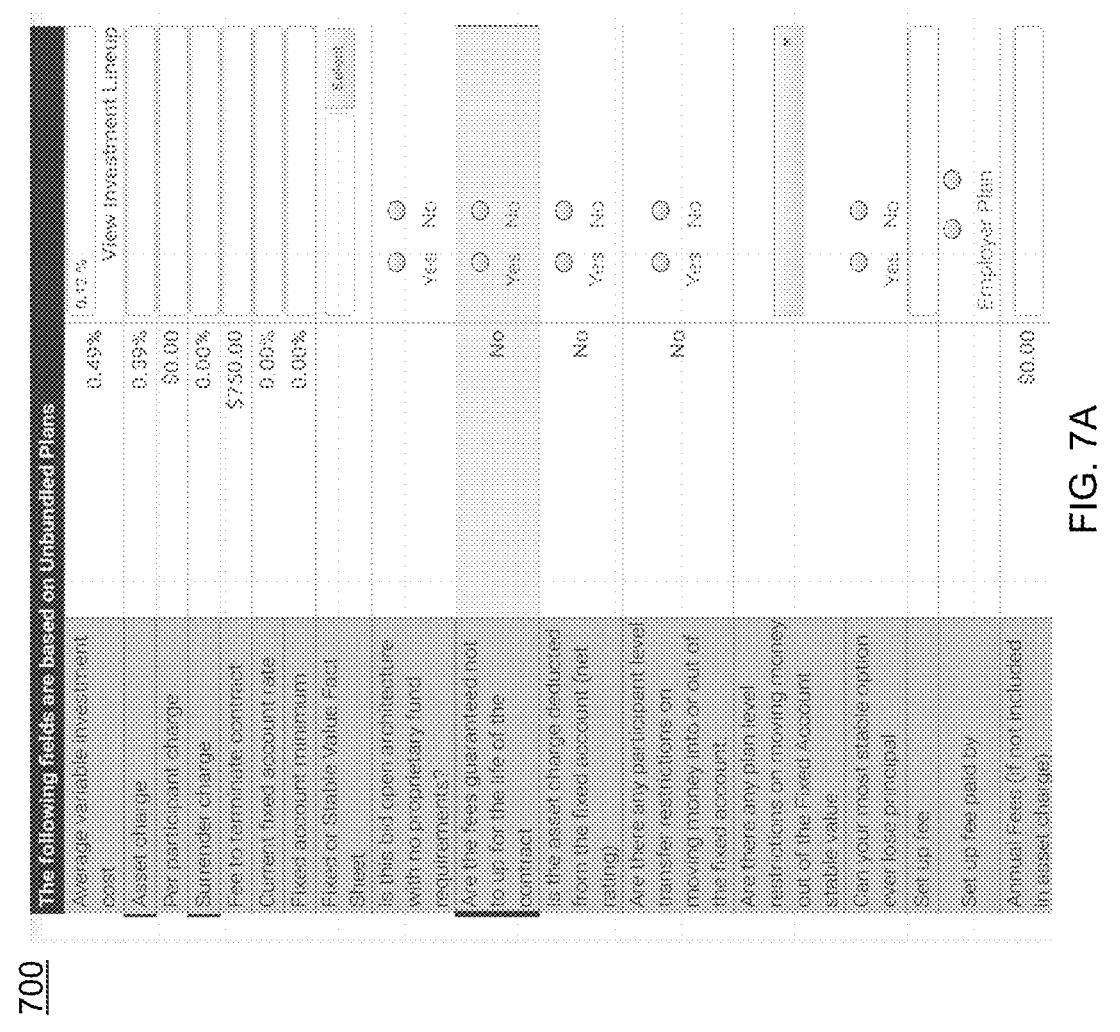

Another Step includes displaying, by the at least one service provider, at least one retirement plan-related service for the retirement plan. As FIGS. 7A-7C reference, the service provider fills out a service provider questionnaire 700 to help the user, employee, and notification manager better understand the services and price points offered for different retirement plan options. The first page of questionnaire 700 can include financial information about the costs and types of retirement plans offered by service provider. Exemplary questions include a text space requesting a value for "Average Variable Investment Cost", "Asset Charge", Per Participant Charge", "Surrender Charge". Other questions include: "Is this bid open architecture with no proprietary fund requirements?", "Are the fees guaranteed not to up for life of the contract?", Can you most stable option ever lose principle?" (FIG. 7A).

Figure 7B:
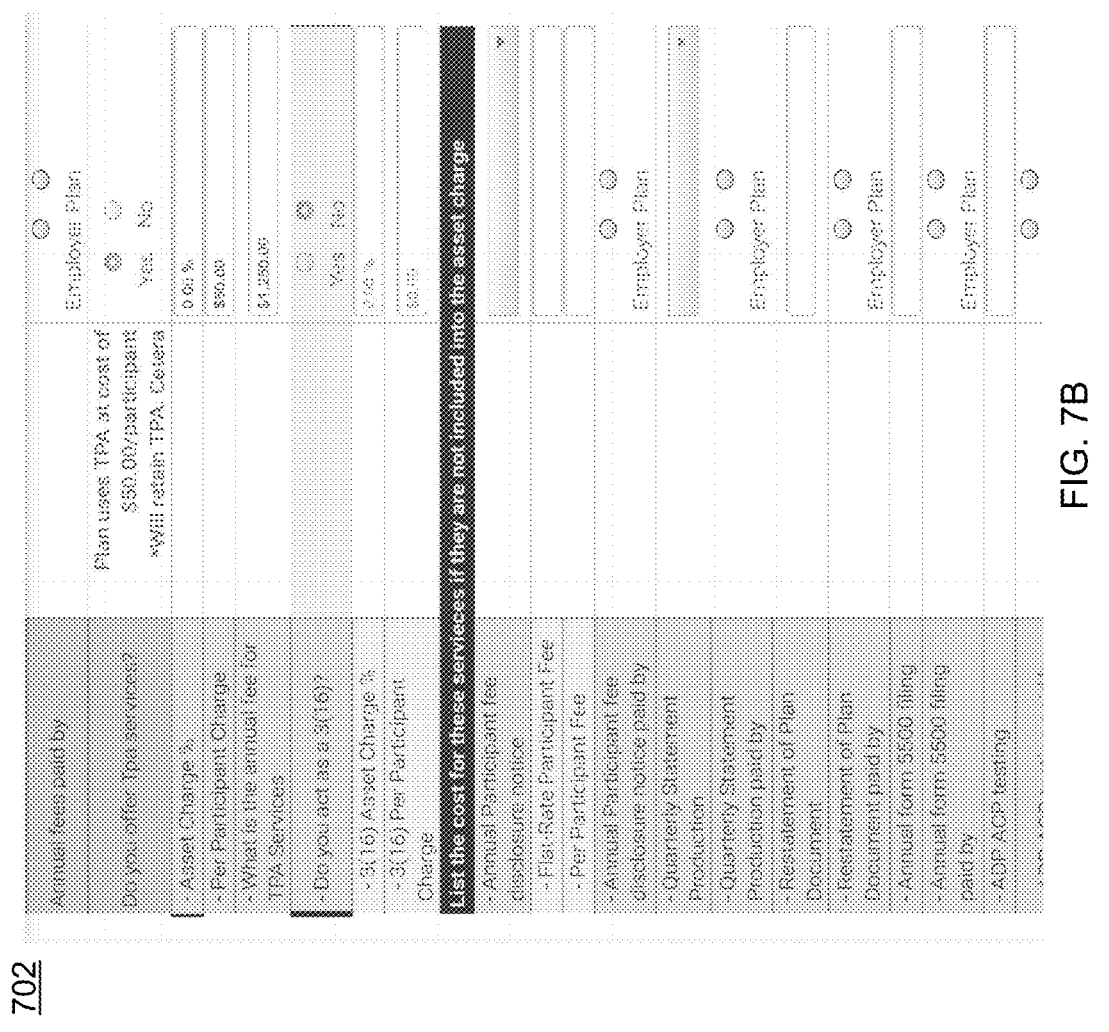
Figure 7C:
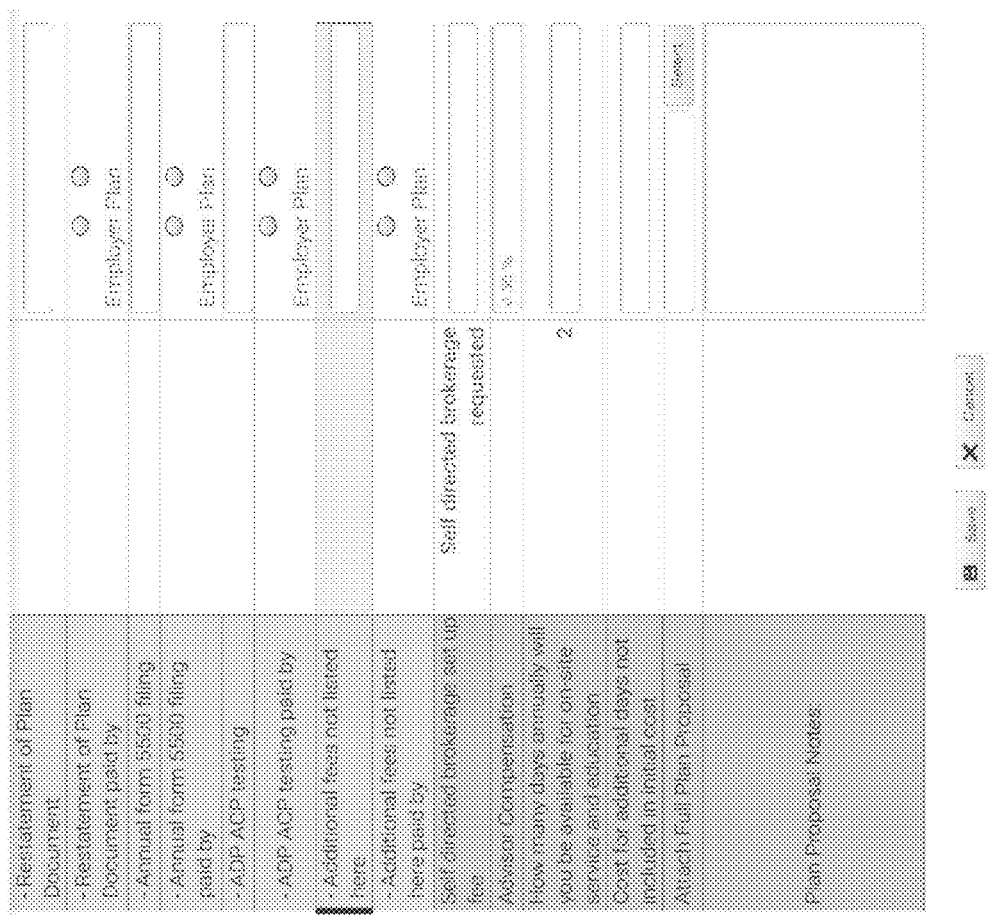

A second page 702, referenced in FIG. 7B, can be used to assess costs of the retirement services. Exemplary questions may include, "Annual Participant Fee Disclosure Notice", "Flat Rate Participant Fee", Quarterly Statement Production", and "Annual Form 5500 filing" (FIG. 7B). A third page 704 assesses additional fees, including, "Self-Directed Brokerage Fee", "Advisor Compensation", and "Cost for Additional Days Not Included in Initial Cost" (FIG. 7C).

Figure 3A:
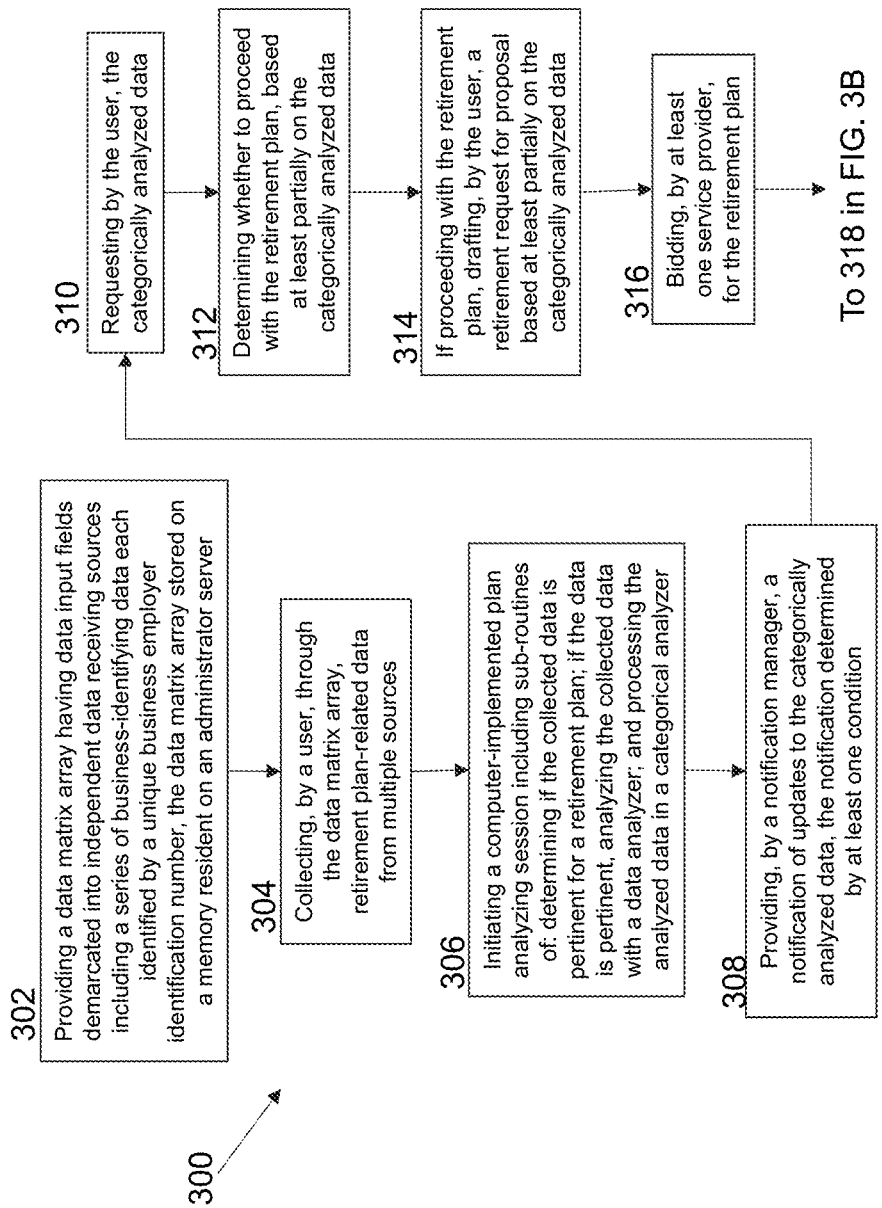
FIGS. 3A and 3B are flowcharts of an exemplary method for implementation and administration of an employer-sponsored retirement plan, in accordance with the present invention.
Figure 3B:
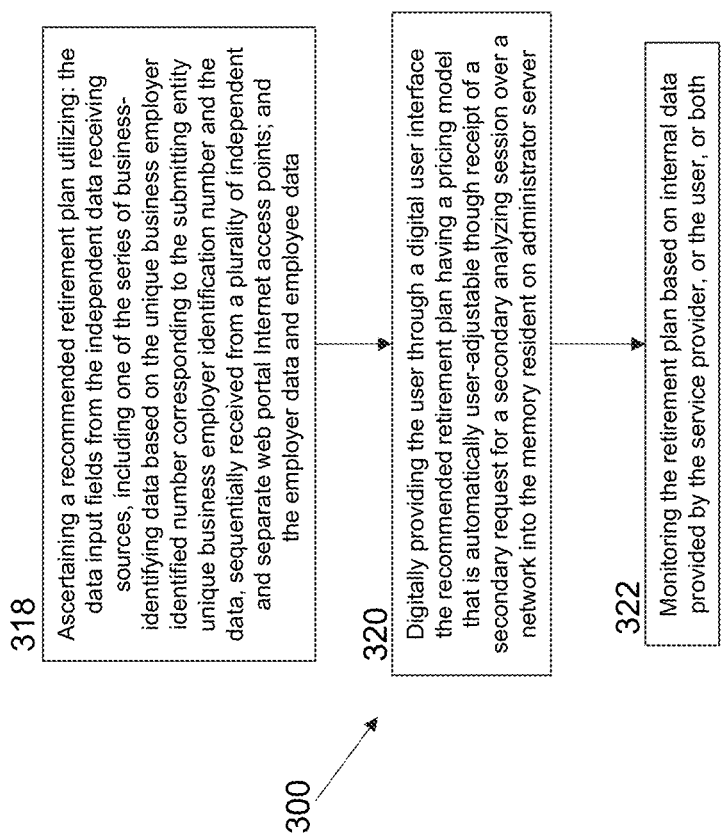

Looking now at FIG. 3B, a Step 318 comprises ascertaining a recommended retirement plan utilizing: the plurality of data input fields from the plurality of independent data receiving sources, including one of the plurality of the series of business-identifying data based on the unique business employer identified number corresponding to the submitting entity unique business employer identification number and the data, sequentially received from a plurality of independent and separate web portal Internet access points; and the employer data and employee data.

The Step of ascertaining a recommended retirement plan, further comprises providing a score based on the key metric from a profile of the service provider and at least one attribute of the bid. The Step can also include providing a direct cost comparison of the proposed retirement plan from the service provider, to the user retirement plan.

The method 300 may further comprise a Step 320 of digitally providing the user through a digital user interface the recommended retirement plan having a pricing model that is automatically and selectively user-adjustable though receipt of a secondary request for a secondary retirement plan analyzing session over a network into the memory resident on the administrator server.

A final Step 322 for the method 300 includes monitoring the selected retirement plan based on internal data provided by the service provider, or the user, or both. The monitoring involves comparing the result of the original analysis at the time of the bid against a daily analysis, the daily analysis factoring in additional data collected since the time of the bid. The monitoring function can include monitoring the key metric deviating from a predetermined level, whereby deviation from the key metric triggers the notification to the user to initiate a formal review of the retirement plan.

An alternative embodiment of the method 300, includes determining a total cost for the retirement plan, the total cost comprising the combination of a record keeper fee, a third party administrator fee, and an investment lineup fee. The total cost of the retirement plan includes fees for all service providers and cost for the size of the retirement plan. The record keeper fee is essentially the fee for the service provider. The user selects the service provider partially based on this fee. The third party administrator fee is another fee for a service provider. The investment lineup fee can include a fee to the investment manager. The fees are also dependent on the type of retirement plan; for example, whether a 401(a) retirement plan, or a 401(b) voluntary retirement plan is selected.

The method 300 is unique in that it allows an employee, who is receiving the retirement plan, to participate. Thus, in one embodiment of the method 300, a step involves checking, by an employee, on a status of the retirement plan. The employee can log in and access the data, similar to the user (employer) or service provider. In another Step, the employee can request that the user utilize the method for selecting the retirement plan. This can be done remotely by known communication methods.

Although the process-flow diagrams show a specific order of executing the process steps, the order of executing the steps may be changed relative to the order shown in certain embodiments. Also, two or more Blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A computer-implemented method for implementation and administration of an employer-sponsored retirement plan, the method comprising:
   providing a data matrix array having a plurality of data input fields demarcated into a plurality of independent data receiving sources including a plurality of a series of business-identifying data each identified by a unique business employer identification number, the data matrix array stored on a memory resident on an administrator server;
   receiving and storing employer data and employee data, inserted into a digital user interface of a user, including a submitting entity unique business employer identification number, and a request for a plan analyzing session over a network into the memory resident on the administrator server;
   initiating, through a computing processor, a computer-implemented plan analyzing session on the server, the computer-implemented plan analyzing session including sub-routines of:
      receiving and storing data in the plurality of data input fields from the plurality of independent data receiving sources, including a plurality of independent and separate web portal Internet access points;
      ascertaining a recommended retirement plan utilizing:
         the plurality of data input fields from the plurality of independent data receiving sources, including one of the plurality of the series of business-identifying data based on the unique business employer identified number corresponding to the submitting entity unique business employer identification number and the data, sequentially received from the plurality of independent and separate web portal Internet access points; and
         the employer data and employee data;
   providing, by a notification manager, a notification of updates to the employer data and employee data, the notification determined by at least one condition; and
   digitally providing to the user, from at least one service provider and through the digital user interface, the recommended retirement plan having a pricing model that is automatically and selectively
user-adjustable through receipt of a secondary request for a secondary retirement plan analyzing session over the network into the memory resident on the administrator server.

2. The computer-implemented method for implementation and administration of the retirement plan according to claim 1, further comprising:
   receiving and storing a plurality numerical values, each representing a plan characteristic, collectively totaling 100%, through the digital user interface provided to the user for independent selection, the sub-routines of the computer-implemented plan analyzing session including utilizing each of the plurality numerical values as weighted values to dictate the recommended retirement plan.

3. The computer-implemented method for implementation and administration of the employer-sponsored retirement plan according to claim 1, wherein the step of:
   initiating, through a computing processor, a computer-implemented plan analyzing session on the server, further comprises analyzing the collected data with a data analyzer.

4. The computer-implemented method for implementation and administration of the retirement plan according to claim 3, wherein:
   the step of analyzing the collected data with a data analyzer, further comprises calculating a Net Fixed Rate, Total Fees, Fixed Account Rating, and Annual Interest from Fixed Account.

5. The computer-implemented method for implementation and administration of the employer-sponsored retirement plan according to claim 1, wherein the step of:
   initiating, through a computing processor, a computer-implemented plan analyzing session on the server, further comprises processing the analyzed data in a categorical analyzer.

6. The computer-implemented method for implementation and administration of the retirement plan according to claim 5, wherein:
the step of processing the analyzed data in a categorical analyzer, further comprises generating a Fee Ranking, the Fee ranking being dependent on categories derived from multiple retirement plan sizes.

7. The computer-implemented method for implementation and administration of the retirement plan according to claim 6, wherein:
the step of processing the analyzed data in a categorical analyzer, further comprises a final Request for Proposal score for the service provider.

8. The computer-implemented method for implementation and administration of the retirement plan according to claim 7, wherein:
the final Request for Proposal score is based on the Fee Ranking and categorized capabilities pertaining to Plan Features, Available Technology, and Customer Service.

9. The computer-implemented method for implementation and administration of the employer-sponsored retirement plan according to claim 8, further comprising:
drafting, by the user, a retirement request for proposal based at least partially on the categorically analyzed data.

10. The computer-implemented method for implementation and administration of the employer-sponsored retirement plan according to claim 1, further comprising:
bidding, by the service provider, for the retirement plan.

11. The computer-implemented method for implementation and administration of the employer-sponsored retirement plan according to claim 1, further comprising:
monitoring the selected retirement plan based on internal data provided by the service provider, or the user, or both.

12. The computer-implemented method for implementation and administration of the retirement plan according to claim 1, wherein:
the at least one condition for the notification includes detection of new data, the new data based on a predetermined timeframe.

13. A computer-implemented method for implementation and administration of an employer-sponsored retirement plan, the method comprising:
providing a data matrix array having a plurality of data input fields demarcated into a plurality of independent data receiving sources including a plurality of a series of business-identifying data each identified by a unique business employer identification number, the data matrix array stored on a memory resident on an administrator server;
collecting, by a user, through the data matrix array, retirement plan-related data from multiple sources;
initiating, through a computing processor, a computer-implemented plan analyzing session on an administrator server, the computer-implemented plan analyzing session including sub-routines of:
determining if the collected data is pertinent for a retirement plan;
if the data is pertinent, analyzing the collected data with a data analyzer; and
processing the analyzed data in a categorical analyzer;
providing, by a notification manager, a notification of updates to the categorically analyzed data, the notification determined by at least one condition;
requesting by the user, the categorically analyzed data;
determining whether to proceed with the retirement plan, based at least partially on the categorically analyzed data;
if proceeding with the retirement plan, drafting, by the user, a retirement request for proposal based at least partially on the categorically analyzed data;
bidding, by at least one service provider, for the retirement plan;
ascertaining a recommended retirement plan utilizing:
the plurality of data input fields from the plurality of independent data receiving sources, including one of the plurality of the series of business-identifying data based on the unique business employer identified number corresponding to the submitting entity unique business employer identification number and the data, sequentially received from a plurality of independent and separate web portal Internet access points; and
the employer data and employee data;
digitally providing to the user, through a digital user interface, the recommended retirement plan having a pricing model that is automatically and selectively user-adjustable through receipt of a secondary request for a secondary retirement plan analyzing session over a network into the memory resident on the administrator server; and
monitoring the selected retirement plan based on internal data provided by the service provider, or the user, or both.

14. The computer-implemented method for implementation and administration of the retirement plan according to claim 13, wherein:
the step of collecting retirement plan-related data from multiple sources, further comprises receiving and storing employer data and employee data, inserted into the digital user interface of the user.

15. The computer-implemented method for implementation and administration of the retirement plan according to claim 13, further comprising:
storing the categorically analyzed data in a categorical data storage.

16. The computer-implemented method for implementation and administration of the retirement plan according to claim 13, further comprising:
displaying, by the at least one service provider, at least one retirement plan-related service for the retirement plan.

17. The computer-implemented method for implementation and administration of the retirement plan according to claim 1, wherein:
the multiple sources for the collected data include at least one of the following: an employer application, an employer questionnaire, a public plan data, and an user plan request.

18. The computer-implemented method for implementation and administration of the retirement plan according to claim 13, wherein:
the step of analyzing the collected data with a data analyzer, further comprises calculating a Net Fixed Rate, Total Fees, Fixed Account Rating, and Annual Interest from Fixed Account.

19. The computer-implemented method for implementation and administration of the retirement plan according to claim 18, wherein:

the step of analyzing the collected data with a data analyzer is performed for the collected data and for the bid provided by the service provider.

\* \* \* \* \*